March 21, 1944.  A. GOETZ  2,344,548
METHOD AND APPARATUS PROVIDING CONTINUOUSLY EFFECTIVE
SOURCES FOR OLIGODYNAMIC STERILIZATION
Filed Feb. 6, 1940  2 Sheets-Sheet 1
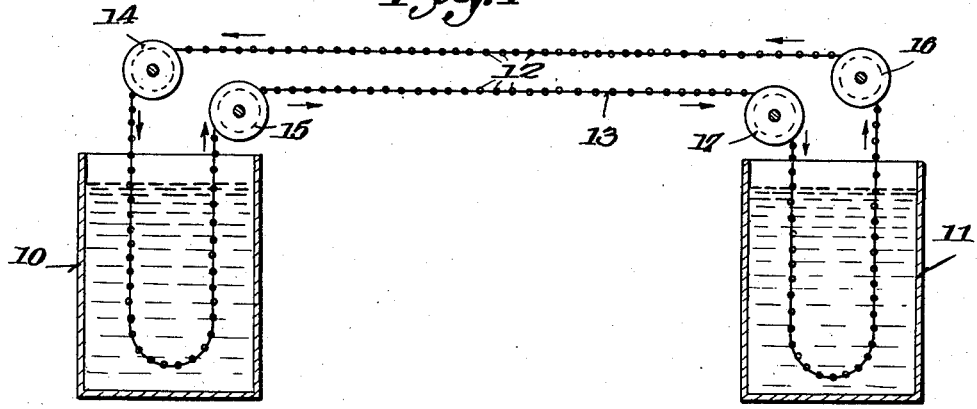
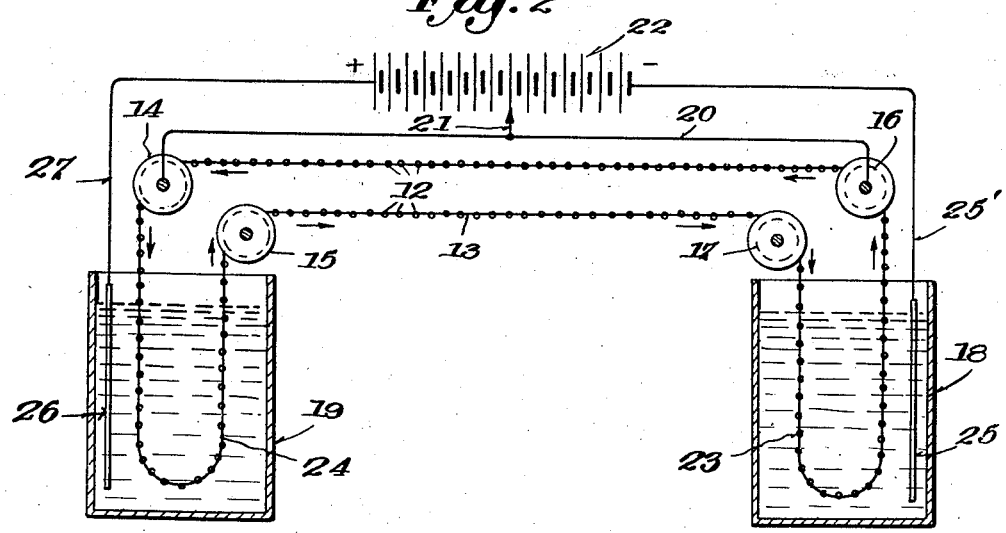
Inventor
Alexander Goetz,
By Bacon & Thomas
his Attorneys March 21, 1944.      A. GOETZ      2,344,548
METHOD AND APPARATUS PROVIDING CONTINUOUSLY EFFECTIVE
SOURCES FOR OLIGODYNAMIC STERILIZATION
Filed Feb. 6, 1940      2 Sheets-Sheet 2
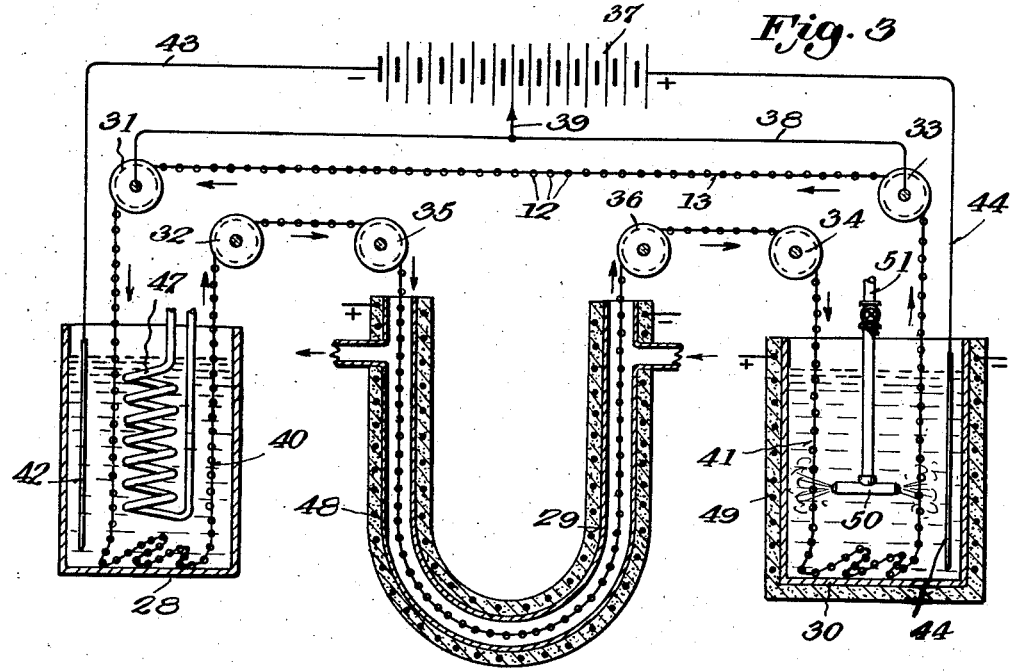
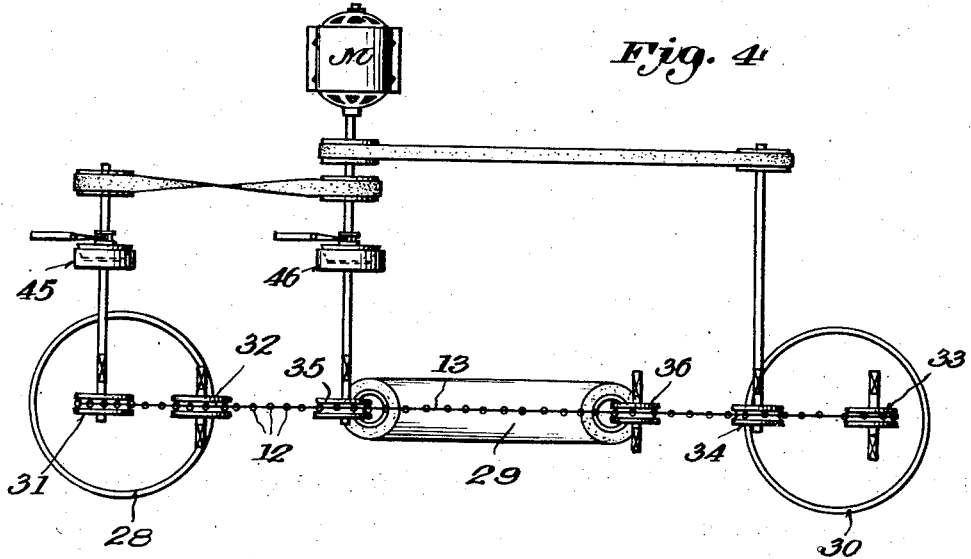
Inventor
Alexander Goetz,
By Bacon & Thomas
his Attorneys Patented Mar. 21, 1944

2,344,548

UNITED STATES PATENT OFFICE 2,344,548

METHOD AND APPARATUS PROVIDING A CONTINUOUSLY EFFECTIVE SOURCE FOR OLIGODYNAMIC STERILIZATION

Alexander Goetz, Pasadena, Calif., assignor to Sunshine Mining Company, Yakima, Wash., a corporation Application February 6, 1940, Serial No. 317,606

12 Claims. (Cl. 204—137)

My invention is directed to a method and apparatus providing a continuously effective source of catalytic or oligodynamic activity and use of same in treating materials.

As is well known, in the treatment of materials involving the action of catalysts or of oligodynamic metals, the activity of the catalyst or oligodynamic metal is relatively short lived due either to an inherent tendency of the catalytic substance or oligodynamic metal to gradually lose its capability of catalytic or oligodynamic action or to inactivating deposits upon them occurring in consequence of their use. The result heretofore has been that in the treatment of materials requiring the use of catalysts or oligodynamic metals, the treatment could not be a continuous one over any substantially prolonged period of time but had to be interrupted, usually for removal of the catalytic substance or oligodynamic metal from the zone of the treating operations for cleaning from the inactivating deposits or replacement with a freshly activated catalyst or oligodynamic metal. In some prior practices of the electro-oligodynamic method of sterilizing a liquid, involving the use of an electric current and electrodes immersed in the liquid with the oligodynamic metal as the anode, the removal of inactivating deposits from and reactivation of the oligodynamic metal have been obtained, without removal of that metal, simply by reversal of polarity of the electrodes. But that mode of reactivation also requires some interruption of the sterilizing operation and is additionally objectionable, as hereinafter more fully pointed out, in leaving within the liquid treating zone the deposits removed from the oligodynamic metal.

The broader or more general principles of my invention may be embodied in a method and apparatus for various treatments of materials requiring as the treating agent either a catalytic substance or an oligodynamic metal; and in that broader or more general aspect of my invention its general object is the provision, in the method and apparatus, of a continuously effective source of catalytic or oligodynamic activity and such use of the same as to avoid the above-mentioned interruptions to and objectionable features attending the above mentioned prior methods of catalytic or oligodynamic treatments of materials.

In its above-stated broader aspects, the method of my invention involves, in fundamental principle, the maintenance by any suitable mechanical means of an endless series of catalytic or oligodynamic bodies or masses or coatings of catalytic or oligodynamic substance on bodies or masses of other material, with each catalytic or oligodynamic body, mass or coating in the endless series moving in repeated cycles of movement into and out of operative relation with the material undergoing the catalytic or oligodynamic treatment, and subjecting the catalytic or oligodynamic bodies, masses or coatings to a reactivating treatment or a deposit-removal treatment or both at points in their path of movement outside of the material-treating zone.

My invention is one more particularly directed to the activation and use of oligodynamic metal and like oligodynamic substances in the sterilization of liquids.

As is well known, water, fruit juices, milk and other liquids requiring sterilization may be sterilized by contact therewith of certain metals, particularly silver, gold, copper, mercury and lead, and alloys or compounds of those metals, which function in the sterilization by emission of ions from their surfaces into the surrounding liquid. Or, as is commonly stated, they function in their sterilization effect by oligodynamic action; and the mentioned metals and others, their alloys and compounds, are usually referred to as oligodynamic metals or substances.

My experimentation and researches have indicated to me, however, that a previous activation of the metal or other substance is required for any practically effective degree of oligodynamic activity; and while that activation may be effected in the case of metallic silver, which may be here taken as typical of the metals or other oligodynamic substances under consideration, by contacting it with oxygen or chlorine, the activation by atomic oxygen or oxygen ions is particularly efficient and satisfactory. Hence, that activation will be here taken as a representative one.

My invention includes the activation of the metal either by a chemical or an electrolytic treatment. In the chemical activation treatment, the metal, for example silver, is brought into contact with any substance such as a solution of hydrogen peroxide which will cause the attachment of O or $O_2$ to the silver surface. Or, gaseous oxygen or a gaseous oxygen compound rendering part or all of its oxygen content available for adsorption by the silver may be employed for the chemical activation by contacting the metallic silver with the gaseous medium at any temperature suitable and effective for the development of oxygen atoms and their adsorption on the silver.

In the electrolytic activation treatment a silver body is employed as the anode or metallic silver is attached to the anode in an electrolytic cell and highly diluted potassium hydroxide, sulphuric acid or other oxygen containing electrolyte may be employed.

My invention also includes two broadly differing methods of sterilizing liquids by oligodynamic activity of the activated silver. One is the simple contact method in which the liquid to be sterilized is brought into contact with the activated silver by immersion of the latter, either as an activated silver body or as activated silver on a suitable carrier body, in a body of the liquid or by a stream flow of the liquid into contact with the activated silver. The other is the electro-oligodynamic method in which the activated silver in suitable body form or as a silver surface on a suitable carrier body is employed as the anode in an electric circuit which includes the liquid to be sterilized, this latter method having the advantage of substantially accelerating the emission of silver ions into the liquid and thereby the oligodynamic sterilizing action of the silver.

While the electrolytic method as well as the chemical method of activating the silver may be carried out separately from the body of the liquid to be subsequently treated, in many instances the liquid to be sterilized is capable without detriment to its intended future use of acting either alone or with suitable additions thereto for increase of conductivity as the electrolyte for the electrolytic activation of the silver. Therefore, in such instances the electrolytic method of activating the silver and the electro-oligodynamic method of sterilizing the liquid may, within the scope of my invention, be made to occur in the same body of liquid and in the same apparatus, with such changes in the electric current, if any, as may be required for the electro-oligodynamic sterilization following the electrolytic activation of the silver.

When the silver has been activated either by the chemical or the electrolytic method of activation separately from the liquid to be sterilized and the sterilization is by the simple method of contacting the liquid with the activated silver so that no electric current is employed tending to cause or accelerate deposits out of the liquid on the silver, in many instances no deposits are formed out of the body of the liquid on the silver surface unfavorably affecting its oligodynamic activity. But even where no deposits are formed on the surface of the silver, nevertheless there is a gradual loss of activity by the silver which has heretofore necessitated its replacement in the body of the liquid by freshly activated metal.

On the other hand, when the activated silver is employed in the electro-oligodynamic method of sterilization, the current employed in that method of sterilization would tend to renew or maintain the required oligodynamic activity of the silver on the anode were it not for the fact that, in the case of many liquids, that current causes deposits out of the liquid upon the silver surface of the anode which rapidly decrease and then stop the activity of the silver. In the treatment of such liquids, the result has heretofore frequently been to require removal of that electrode for cleaning or its replacement with one comprising freshly activated silver, for a reversal of the polarity so as to return the deposited substance to the body of the liquid has not been satisfactory in a number of cases since that produces undesirable results in the liquid itself.

Therefore, both the simple contact method and the electro-oligodynamic method of using the activated silver in sterilization of liquids have heretofore been subject to the above mentioned inherent defects which have rendered the activated silver ineffective as a continuous source of oligodynamic activity and have prevented the oligodynamic sterilization of liquids from being a continuous process over any fairly prolonged period of time.

Consequently, a particular object of my invention is to provide for repeated or renewed activations of the silver or other oligodynamic substance by chemical or electrolytic methods of activation without the interruptions to the process of sterilizing the liquid heretofore required.

A still further object of my invention is the provision of means for optimum oligodynamic activation of the silver or other substance capable of such activation, independently of the time and conditions for optimum oligodynamic activity of the activated substance, and for adapting both the activation and the oligodynamic activity of the substance to the particular nature of the liquid to be treated.

In the oligodynamic sterilization of liquids the method of my invention involves the maintenance on an endless carrier of an endless series of silver surfaces, with each silver surface moving in repeated cycles of movement in a predetermined endless path into and out of contact with the liquid to be sterilized, while continuous activating or deposit-removing or both treatments of the silver surfaces are made at points in that path of their movements outside the liquid undergoing sterilization.

For the activation of the metallic silver by the electrolytic method either separately from or in the body of the liquid to be sterilized and the utilization of the activated silver in the electro-oligodynamic sterilization of the liquid, the series of silver surfaces are electrically connected with the source of current in a manner to cause them, when in the separate electrolyte or in the body of the liquid to be sterilized, to function as the anode, while the cathode may be of any suitable material. Sterilization of the liquid is then carried on by the electro-oligodynamic method; and, as before pointed out, the electric current employed in that method of sterilization would tend to renew or maintain the activity of the oligodynamic silver surface of the anode were it not for the fact that in the treatment of certain liquids that current also causes deposits out of the liquid on that surface which rapidly decrease and finally stop the oligodynamic activity of the metal. Accordingly, in many instances of the liquid to be sterilized, where the activated silver is used in the electro-oligodynamic method of sterilization, continued activation as well as continued oligodynamic activity of the silver may be attained simply by subjecting the successive silver surfaces on the carrier to deposit-removing treatments at a point in their path of movement outside the body of liquid undergoing sterilization.

So far as the process or method of my invention is concerned, any suitable receptacle or other means may be employed for so disposing the liquid to be sterilized as to enable intimate contact of the silver therewith. Also, any suitable carrier or other mechanical means may be employed for maintaining the silver in use as an endless series of silver surfaces and imparting the mentioned cyclic movements thereto into and out of contact with the liquid to be treated.

Likewise, any suitable receptacle and mechanical and electrical means may be employed for the activation of the silver surfaces and for removal of deposits therefrom at a point in their travel out of contact with the liquid undergoing treatment.

However, my invention also includes an apparatus having various mechanical features which particularly adapt it for carrying out the foregoing process or method operations with optimum efficiency.

The foregoing objects and principles of my invention both as to the method and the apparatus and other objects and principles thereof will more fully appear from the hereinafter described specific practices of the invention in connection with the accompanying drawings. It is to be understood, however, that although they are the most useful practices of the invention now known to me, they are not to be taken as limitations on the scope of the invention since modifications and variations in their various features both as to the method and apparatus may be made within the intended scope of the invention which is as defined in the appended claims.

In view of the fact that silver may be and has hereinbefore been taken as typical of the various oligodynamic metals and their alloys and compounds which may be used in the practice of my invention, the specific practices of that invention will be referred to only in connection with silver as the oligodynamic substance used.

In the accompanying drawings forming a part of this specification:

Fig. 1 illustrates more or less diagrammatically an embodiment of the apparatus and a practice of the method of my invention in initial and repeated or continuous chemical activation of the metallic silver separately from the body of the liquid to be sterilized and continuous use of the oligodynamically activated metal in the simple contact process of sterilizing the liquid;

Fig. 2 illustrates more or less diagrammatically an embodiment of the apparatus and a practice of the method of my invention in the electrolytic activation of the metallic silver in a body of the liquid to be sterilized, in the use of the activated silver in the electro-oligodynamic sterilization of the liquid, and in the electrolytic cleaning of the activated silver from inactivating deposits thereon out of the liquid undergoing sterilization without interruption of the sterilization process;

Fig. 3 illustrates more or less diagrammatically an embodiment of the apparatus and a practice of the method of my invention in the initial and repeated or continuous electrolytic activation of the metallic silver separately from the liquid to be sterilized, in the continuous use of the activated silver in the simple contact method of sterilization of a liquid and in the cleaning of the activated silver from deposits out of the liquid undergoing sterilization without interruption of the sterilization process;

Fig. 4 is a more or less diagrammatic top plan view of the carrier for the silver and driving mechanism for the carrier employed in the apparatus illustrated in Fig. 3; and Fig. 5 is an enlarged view, partly in elevation and partly in cross-section, of a portion of the carrier with silver surfaces thereon.

In the apparatus of my invention, the silver is maintained by suitable mechanical means for use as an endless series of silver surfaces with each silver surface of the series moving in recurring cycles in a predetermined endless path into and out of contact with the liquid to be treated. To that end, the silver may be simply coatings on or may form a structural part of an endless flexible carrier. The endless flexible carrier may, for example, consist of an endless chain composed entirely of metallic silver, or it may be composed of a chain of baser metal coated with silver. Or the endless flexible carrier may be of the belt type of construction with surface coatings of silver thereon or it may be a beaded filament with the beads composed entirely of silver or of other material simply silver coated. In all cases where electrolytic activation of the silver is desired, the carrier must of course be electroconductive.

Referring now to the practice of my invention for continuous chemical activation of the silver out of contact with the liquid to be sterilized and continuous use of the activated silver in the simple contact method of sterilizing a liquid, as illustrated in Fig. 1, two separate containers, receptacles or tanks 10 and 11 are employed, the first to contain the liquid medium employed for activation of the silver by contact therewith and the second to contain the liquid to be sterilized.

In that practice of the invention, the endless series of silver surfaces are presented by a series of globular beads 12 which may be composed entirely of metallic silver or of other material such as hard solid carbon with a surface coating of silver and which are strung on an endless flexible filament such as a fine, flexible wire 13 of a metal which is not subject to electrolytic corrosion, such as aluminum, stainless steel, platinum or the like. Or, without necessarily employing such metal for the wire 13, that wire may be provided in known manner with a coating or surface passivation not interfering with the electric conductivity but affording protection against electrolytic corrosion of the wire. I preferably use for the beads a hard, solid and globular carbon body 12' with a surface coating 12 of silver thereon, and that is the construction intended to be represented in all the views of the drawings. The endless carrier thus formed with its endless series of silver surfaces thereon, is trained over each of a pair of pulleys 14 and 15 rotatably mounted above the receptacle 10 in fixed supports not shown, and also over each of a pair of pulleys 16 and 17 likewise rotatably mounted over the receptacle 11. As shown in Fig. 1, the endless carrier, with its endless series of silver surfaces, is made of such length as to depend from the pairs of pulleys in looped fashion well into the receptacles 10 and 11 and below the maintained levels of the contained aqueous solution of the activating substance in the receptacle 10 and the liquid to be sterilized in the receptacle 11. The pulleys 15 and 16 may be idler pulleys while the pulleys 14 and 17 are driven in the direction of the arrows shown on Fig. 1 by a suitable prime mover and transmission mechanism not shown but which may be identical with the prime mover and transmission mechanism shown in plan view in Fig. 4 for driving the pulleys 34 and 35 employed in the practice of the invention hereinafter described in connection with Figs. 3 and 4.

In the practice of my invention by the apparatus illustrated in Fig. 1, the receptacle 10 is filled to the indicated level with a liquid medium such, for example, as an aqueous solution of hydrogen peroxide, which by chemical interaction with the silver on the carrier will cause the attachment of O or O₂ to the silver surfaces and thereby render them oligodynamically active. The receptacle 11 is filled to the indicated level with the liquid to be sterilized, such for example, as water, vegetable or meat broth, milk, fruit juice, or the like. The pulley drive is started and the initially activated silver surfaces are conveyed in successive order in their endless path out of the activating tank 10 into submergence in the liquid undergoing sterilization in the treating tank 11, then out of the treating tank and back into the activating tank, in recurring cycles of travel. The result is an initial activation followed by repeated activations of each silver surface of the series so that there is continuous activation of silver on the carrier over any desired period of time without interruption to the sterilizing process; in other words, continuous activation of silver on the carrier and continuous oligodynamic sterilizing action of activated silver as long as desired.

An electrolytic activation of the silver instead of a purely chemical activation is applicable where the liquid to be treated can be used, either alone or with suitable additions for greater electric conductivity, as an electrolyte without detriment to its intended final use, as is the case with bath water, potable water and many other potable liquids and liquid foods. Also where the activated silver is used in the electrooligodynamic sterilization of the liquid, for reasons before stated only a cleaning of the silver from inactivating deposits on it occurring during its contact with the liquid undergoing sterilization is essential for the continued oligodynamic activity of the silver. Accordingly, the practice of my invention as illustrated in Fig. 2 is adapted to the electrolytic activation of the silver, its use in electro-oligodynamic sterilization of liquids, and the maintenance of the silver in activated condition.

As illustrated in Fig. 2, two separate receptacles, containers or tanks are also there employed, the tank 18 for the liquid to be sterilized, for the electrolytic activation of the silver therein and for the electro-oligodynamic sterilization, and the tank 19 for a deposit-removal treatment of the activated silver surfaces and for the liquid medium employed in that treatment.

In the practice of the invention as illustrated in Fig. 2, an endless carrier with the endless series of silver surfaces thereon and driving means for the carrier identical with the carrier and driving means described in connection with Fig. 1 is used, as shown by the identical parts with the same reference numerals 12 to 17, inclusive, in the two views. In the practice of the invention as illustrated in Fig. 2, however, the carrier is connected, through the shafts of pulleys 14 and 16 and those pulleys, all of metal or other suitable electro-conductive material, and the conductors 20 and 21, with a battery 22 as a representative source of electric current in a manner causing the silver on the looped portion 23 of the carrier in tank 18 to function as an anode and the silver on the looped portion 24 of the carrier in tank 19 to function as a cathode. The tank 18, containing the silver on the looped portion 23 of the carrier as an anode, is provided with a complementary cathode 25 connected by conductor 25' with the negative side of the battery 22; and the tank 19, containing the silver on the looped portion 24 of the carrier as a cathode, is provided with a complementary anode 26 connected by conductor 27 with the positive side of the battery.

Those complementary electrodes may be of carbon, aluminum or silver or of any other material not detrimental to the particular liquid to be sterilized in tank 18 and the particular liquid employed in the cleaning of the silver surfaces in tank 19. Since any of the liquids hereinafter mentioned as employed in tank 19 for cleaning the silver on the carrier from deposits made thereon out of the liquid undergoing sterilization in tank 18 is an electrolyte, the use of a silver or silver surfaced anode in tank 19 may be advantageous in securing electrolytic deposits of silver on the looped cathode portion 24 of the carrier in that tank and thereby replenishment of silver on the carrier which may have been lost in the electrooligodynamic sterilization of the liquid in tank 18. However, while in some instances the use of silver for the anode 26 in tank 19 may be advantageous as stated, it is not necessary where the carrier contains a sufficiently large supply of silver to last for a long period of time as the above described carrier of my invention provides for.

In the practice of my invention as illustrated in Fig. 2, the tank 18 is filled to the indicated level with the liquid to be treated, and the tank 19 is filled to the indicated level with the liquid selected for employment in the electrolytic removal of deposits from the silver. The nature of the inactivating deposits on the silver occurring during the electro-oligodynamic sterilization of the liquid in tank 18 depends, of course, on the nature of the liquid undergoing the sterilization, although those deposits will consist chiefly of compounds of sulphur, chlorine and the like, and proteins or protein-like substances in case the liquid undergoing the electro-oligodynamic sterilization in tank 18 is of organic colloidal nature, such as broth, fruit juices, milk and the like. However, the aqueous solutions of most weak acids such, for example, as highly diluted sulphuric acid, acetic acid and the like, may be effectively employed in the electrolytic removal from the silver surfaces on the looped portion of the carrier in tank 19 of any deposits likely to occur while the silver is in use in the sterilization of the liquid in tank 18.

In the practice of the invention as illustrated in Fig. 2, care must be taken to keep the electric current at a low enough but sufficient potential, usually about 1.5 volts, for accelerating the oligodynamic action or emission of silver ions into the liquid undergoing sterilization while at the same time avoiding any substantial electrolysis of that liquid especially when it is a liquid food having a high protein content. For the sterilization of some liquid foods requiring particular care in avoiding substantial electrolysis in the electro-oligodynamic method of sterilization, the practice of my invention as illustrated in Fig. 3 is preferable to that illustrated in Fig. 2 because it has certain advantages among which are a greater uniformity in the silver ion concentration in the liquid undergoing sterilization while at the same time it avoids the electro-oligodynamic sterilization with its attendant requirement of two electrodes in and the passage of current through that liquid with the possibility of substantial electrolysis of the liquid unless particular care is taken in the control of the current.

In the practice of the invention as illustrated in Fig. 3, three liquid containers 28, 29 and 30, as separate operating zones are provided, the first for the activation of the silver, the second for the use of the activated silver in sterilizing the desired liquid and the third for cleaning the silver from any inactivating deposits thereon occurring in the use of the silver in the liquid sterilizing zone. The endless carrier with its endless series of silver surfaces identical with that employed in the Figs. 1 and 2 arrangements, is so driven as to advance those surfaces in recurring cycles of movement through those three operating zones in succession and through the liquids employed therein.

The carrier, comprising the endless series of beads 12' of hard, solid carbon with surface coatings of silver, and the fine flexible endless wire 13 upon which they are strung, is trained over the pair of pulleys 31 and 32 rotatably mounted in fixed supports not shown above the activation tank 28, over a like pair of pulleys 33 and 34 above the deposit-removal tank 30, and over each of the pulleys 35 and 36 rotatably mounted respectively above the opposite open ends of the liquid sterilizing receptacle which in this instance is a U-tube for a stream flow of the liquid therethrough in a direction either with or counter to the motion of the carrier through the tube, although preferably, and as shown by the arrows on Fig. 3, the stream flow of the liquid is in a direction counter to the direction of motion of the carrier through the tube. With either direction, this stream flow of the liquid in the relatively narrow tube in contact with the silver on the carrier substantially tends to uniformity in the silver ion concentration throughout the liquid and consequently uniformity of the oligodynamic sterilization.

Instead of the U-shaped tube 29, a tube in the shape of a catenary may be used to advantage.

In the Fig. 3 arrangement, the three pulleys 32, 33 and 36 are idlers while the three pulleys 31, 34 and 35 are driven in the directions of the arrows shown on Fig. 3 by the electric motor M and transmission mechanism shown in Fig. 4.

For the electrolytic activation of the silver on the carrier in the liquid electrolyte employed in the activating tank 28, and the electrolytic cleaning of the silver on the carrier in the liquid electrolyte employed in the cleaning tank 30, the carrier is so electrically connected with the battery through the wires 38 and 39 between the metal shafts of the metal pulleys 31 and 33 as to cause the looped portion 40 of the carrier in the activating tank 28 to function as an anode and the looped portion 41 of the carrier in the cleaning tank 30 to function as a cathode. The complementary cathode 42 in the activating tank 28 has the wire connection 43 with the battery and the complementary anode 44 in the cleaning tank 30 has the wire connection 44' with the battery.

In the practice of the invention as illustrated in Fig. 3, the relative durations of the activating and cleaning treatments of the silver surfaces on the carrier are adjusted as occasion may require; for example, in case the process of activation of the silver requires a longer period of time than the process of cleaning it or vice versa or either requires a longer period of time than that of the useful and efficient activity of the activated silver in the oligodynamic sterilization of the liquid. To that end, the endless carrier with its endless series of silver surfaces is given a surplus length and the transmission mechanism between the motor and the pulleys which drive the carrier is arranged to enable a distribution of the surplus carrier length in the form of piles of varying sizes in the activation tank 28 and in the cleaning tank 30 as shown in Fig. 3, so that the length surplus of the carrier in each tank determines the periods of time over which the silver on the carrier is exposed to the activating and the cleaning treatments.

As the driving pulleys 31, 34 and 35 in the Figs. 3 and 4 arrangement are mechanically coupled with each other while the drive is on all those pulleys, the distribution of the carrier lengths in the activating tank 28 and the cleaning tank 30 of course remain unchanged while that drive is on. In other words, with the sizes of the piles of surplus lengths of the carrier in tanks 28 and 30 once adjusted before the drive is on, they will remain unchanged until a new adjustment is made. Should it be necessary, however, to adjust the duration of the activating or the cleaning treatment while the drive is on, the releasable clutches 45 and 46 in the transmission between the motor and the driving pulleys 31 and 35 (Figs. 3 and 4) enable a temporary disengagement of those pulleys from the drive and a consequent adjustment of the piles of surplus carrier lengths in the chambers 28 and 30. Thus, a temporary disengagement of driving pulley 31 while the drive is still on for driving pulleys 34 and 35 increases the pile of surplus length of the carrier in cleaning tank 30 and correspondingly decreases the same in activating tank 28; and consequently the duration of the cleaning treatment in tank 30 on each of the silver surfaces on the carrier is increased and the duration of the activating treatment in tank 28 on each of the silver surfaces of the carrier is correspondingly decreased, in an amount depending on the time length of the temporary disengagement of the driving pulley 31. Likewise, temporary disengagement of the driving pulley 35 while the drive is still on for driving pulleys 31 and 34 increases the pile of surplus carrier length in activating tank 28 and correspondingly decreases the same in cleaning tank 30, and consequently increases the duration of the activating treatment in tank 28 on each of the silver surfaces of the carrier and correspondingly decreases the cleaning treatment in tank 30 on each of the silver surfaces of the carrier. In further consequence, the durations of the activating and cleaning treatments on each of the silver surfaces of the carrier are adjustably varied also with respect to the duration of the oligodynamic sterilizing action of each of the silver surfaces of the carrier on the liquid in tube 29.

Also, in the practice of the invention illustrated in Fig. 3, the activation of the oligodynamic substance, the oligodynamic sterilization of the desired liquid and the cleaning of the oligodynamic substance from deposits derived from the liquid undergoing sterilization, are carried out at respectively differing temperatures for the most effective performance of those respective operations, the temperature most suitable for each depending on the oligodynamic substance used, the nature of the liquid undergoing sterilization and the nature of the deposits to be removed from the used oligodynamic substance. For the most efficient operation in most, if not all cases, the temperature under which the electrolytic activation treatment is carried out should be lower than that under which the activated substance is used in the sterilization of the liquid and the temperature of the electrolytic cleaning bath should be the highest. For example, if silver is used as the oligodynamic substance as in the practice of the invention illustrated in Fig. 3 and the liquid to be sterilized is of an organic-colloidal nature such as fruit juice, milk, broth or the like, the temperature in the activation tank 28 should be maintained at a value rendering the adsorption of the activating oxygen from the employed liquid electrolyte on the carrier silver most efficient, and that requires, in general, a temperature lower than room temperature; but, of course, that temperature would have to be maintained above the freezing point of the employed electrolyte. Usually the range may extend from 10° C. upward to somewhat less than 40° C. The temperature in the liquid sterilizing zone or tube 29 should be above room temperature or somewhere within the approximate range of 40° C. to 50° C. so as to more favorably influence the rate at which the oligodynamically active silver ions are dispersed from the silver surfaces on the carrier into the liquid undergoing sterilization. While in any case the temperature in the sterilizing zone 29 should be below that for effective pasteurization of the liquid, an upper temperature limit of 50° C. is usually a safe one for any liquid food or beverage except when carbonated. I have also found that such a comparatively slight increased temperature in the sterilization zone 29 is additionally advantageous when sterilizing liquids containing organic colloids, such as fruit juices, broth, milk and other liquid foods, in that the increased temperature renders the cells of such treated liquid foods more oligodynamically sensitive to the action of the silver ions.

Finally, a still higher temperature, between approximately 50° and 100° C., with the latter as a safe upper limit for practically all electrolytes suitable for the electrolytic cleaning of the silver, should preferably prevail in the cleaning tank 30, as such higher temperatures aid in disintegrating the colloidal deposits collected on the silver surfaces of the carrier from the liquid undergoing sterilization in the tube 29 and in bringing the deposited compounds containing sulphur, chlorine, etc., electrically into solution in the cleaning bath. In any case the temperature in the cleaning tank 30 should, of course, be below the boiling point of the electrolyte used therein.

Any suitable cooling and heating means may be employed to establish and maintain the foregoing differential temperatures for the activating, sterilizing and cleaning operations, such, for example, as cooling coils 47 within the activating chamber 28, an electric heating unit 48 embedded in the walls of the U-shaped sterilization chamber or tube 29, and an electric heating unit 49 embedded in the walls of the cleaning chamber 30. In the case of some liquids to be sterilized in the sterilizing zone or tube 29, the inactivating deposits therefrom on the silver surfaces of the carrier may be of a nature causing them to so tenaciously adhere to those surfaces as to require their removal by a mechanical washing process; and, for such removal, the cleaning chamber 30 is additionally provided with fluid jets 50 supplied by pipe 51, with the jets arranged as shown to direct steam or other heated fluid against the carrier.

Any suitable liquid, such as dilute sulphuric acid or potassium hydroxide, for example, may be employed in the silver activating tank 28, which will function as an electrolyte and yield anions of oxygen to be adsorbed by the silver surfaces of the carrier and thereby render those surfaces oligodynamically active.

Under usual conditions any one of the liquids suitable for use in the electrolytic activating tank 28 may also be employed in the electrolytic cleaning tank 30, although certain of those liquids may be found more advantageous than others for use as the electrolyte in the cleaning tank 30 depending particularly on the nature of the inactivating deposits from the liquid undergoing sterilization on the silver surfaces of the carrier. Also it has been found advantageous, under some conditions, to use a different electrolyte in the electrolytic cleaning bath from that used in the electrolytic activating bath. For example, where the liquid undergoing sterilization is of high acidity, the use in the cleaning tank 30 of a liquid of basic nature, such as potassium hydroxide, for example, may be advantageous, in which case a dilute acid would preferably be used as the electrolyte in the activating tank 28.

It is to be understood, of course, that any suitable refrigerant or cooling medium and supply and shut off valves therefor may be used in connection with the cooling coils 47 in the silver activating tank 28 of Fig. 3, for maintaining the desired subnormal temperature in that activating zone. Also, an adjustable resistance element or any other suitable current-control means may be employed in connection with the electric heating units 48 and 49 in the walls of the sterilizing vessel 29 and the cleaning tank 30, for maintaining the desired supernormal temperatures in those sterilizing and cleaning zones. Since such devices for temperature control are well known in the art, it has not been deemed necessary to illustrate them in the drawings.

While in the practice of the invention as illustrated in Fig. 3, two auxiliary tanks, baths or operating zones, i. e., tanks 28 and 30 additional to the liquid treating tube 29, are employed, the number of tanks, baths or operating zones shown in Fig. 3 should not be taken as representative of the total number which may or should be employed in all instances of the practice of the invention there illustrated. For example, in the treatment of some liquids, a plurality of series-connected cleaning tanks or baths the same as or similar to the cleaning bath 30 may be required, or a plurality of series connected liquid treating tubes of the nature of tube 29 may be advisable, with the carrier of the silver surfaces arranged for travel through all the baths or operating zones in successive order and recurring or cyclic movements as illustrated in Fig. 3.

While I have referred to the several illustrative practices of my invention primarily in connection with the oligodynamic sterilization of various liquids, in its broader aspects my invention is not limited to such a typically oligodynamic process but is applicable also to general catalytic uses wherever the activity of the catalytic substance is short lived and requires constant regeneration.

What I claim is:

1. In an apparatus for sterilizing liquids by means of electro-oligodynamy in which the oligodynamically active metal is supplied to the liquid in a liquid treating zone by means of an electric current from electrodes of which at least the anode consists of oligodynamically active metal, means disposing said metal for functioning as said anode in said liquid treating zone and for cleaning said anode from inactivating deposits thereon derived from the liquid undergoing treatment, said means comprising an electrolytic cleaning bath separate from the liquid treating zone, a source of electric potential and an endless electrically-conductive carrier connected to said source of electric potential and having a continuous surface movement in an endless path extending from within the liquid treating zone into said cleaning bath and having said oligodynamic metal so disposed thereon as to present moving surfaces of said metal for functioning while in said treating zone as said anode in the electro-oligodynamic sterilization of said liquid and as a cathode while in said electrolytic cleaning bath for cleaning said moving surfaces of said metal.

2. A method of oligodynamic sterilization of liquids by contact therewith of an oligodynamic metallic substance having the required degree of oligodynamic activity and tending to lose that degree of oligodynamic activity by use of the substance in the treatment of the liquid and capable of reactivation, said method comprising assembling and maintaining a plurality of separate formed masses of said metallic substance in successive order in an endless curvilinear series of said masses, imparting simultaneous and equal rates of movements in constantly recurring cycles to each of said masses in the endless path defined by said endless series of masses, subjecting said liquid to contact at all times during said recurring cycles of movement of said masses with a mass of said substance in a portion only of said endless path of movement of said masses, and subjecting said masses of said substance in succession to reactivating treatments at a point in their recurring cycles of movement out of contact with said liquid.

3. A method of oligodynamic sterilization of liquids by contact therewith of an oligodynamic metallic substance requiring an initial activating treatment to give it the required degree of oligodynamic activity and tending to lose that degree of oligodynamic activity by use of the substance in the treatment of the liquid and capable of reactivation, said method comprising assembling and maintaining a plurality of separate formed masses of said metallic substance in successive order in an endless curvilinear series of said masses, imparting simultaneous and equal rates of movement in constantly recurring cycles to each of said masses in the endless path defined by said endless series of masses, subjecting said masses in succession to activating treatments each time they pass in succession through one portion of their path of recurring cyclic movement and subjecting said liquid to contact at all times during said recurring cycles of movement of said masses with a mass of said substance in another portion only of said endless path of movement of said masses.

4. A method of oligodynamic sterilization of liquid as defined in claim 3 and further characterized by employing silver as said oligodynamic metal substance.

5. A method of oligodynamically sterilizing liquids comprising initially applying an activating treatment to surface exposures of metallic silver on a plurality of silver coated bodies, advancing said bodies in such series order and constantly recurring cycles of movement into and out of a body of the liquid to be sterilized as to cause contact of said liquid with silver at all times during said recurring cycles of movement of said bodies, and repeating said activating treatment on said surface exposures of silver on said bodies during that portion of their recurring cycles of movement between their exits from and their re-entrance to said body of liquid.

6. A method of sterilizing liquids as defined in claim 5 and further characterized by employing hard, solid carbon for said silver-coated bodies and by said initial and repeated activating treatments comprising contacting said silver-coated bodies with a medium developing under the treatment free oxygen atoms and adsorption of the same on said surface exposures of said silver.

7. A method of sterilizing liquids as defined in claim 5 and further characterized by employing hard, solid carbon for said silver-coated bodies and by performing said initial and repeated activating treatments as electrolytic activating treatments in a liquid medium as an electrolyte developing free oxygen for adsorption thereof on said silver-coated bodies.

8. A method of sterilizing by oligodynamic action of silver liquid food having a protein content tending to cause inactivating deposits on the silver, said method comprising initially applying an activating treatment to a plurality of substance portions of silver, then advancing said substance portions of silver in such series order and constantly recurring cycles of movement into and out of a body of the liquid food to be sterilized as to cause contact of silver with said liquid food at all times during said recurring cycles of movement of said substance portions of silver, and subjecting said substance portions of silver in succession first to deposit-removal treatments and then to activating treatments during that portion of their recurring cycles of movement between their exits from and their re-entrance to said body of liquid food.

9. A method of sterilizing liquid foods as defined in claim 8 and further characterized by varying the duration of the activating treatment on each of said substance portions of silver relative to the duration of contact of each of said substance portions of silver with said liquid food.

10. A method of sterilizing liquid foods as defined in claim 8 and further characterized by varying the duration of the deposit removal treatment on each of said substance portions of silver relative to the duration of contact of each of said substance portions of silver with said liquid food.

11. A method of sterilizing liquid foods as defined in claim 8 and further characterized by said activating treatments of said substance portions of said silver being performed as electrolytic activating treatments in a liquid electrolyte at a temperature within an approximate range of 10° C. to 40° C., by effecting said contact of silver with said liquid food at a temperature within an approximate range of 40° C. to 50° C., and by performing said deposit-removal treatments as electrolytic deposit-removal treatments in a liquid electrolyte at a temperature within an approximate range of 50° C. to 100° C.

12. An apparatus for sterilizing liquids by oligodynamic action of silver and for recurrently activating the silver with an electro-negative radical, said apparatus comprising a receptacle containing a liquid electrolyte capable of yielding said electronegative radical, an endless flexible electric-current-conducting carrier element having formed bodies spaced therealong in an endless series and silver in a surface area on each of said bodies with said silver in electrical conductive connection with said carrier element, mounting and driving means for said carrier element driving the same in a predetermined endless path including a dipping run of said carrier element into said receptacle and said liquid-electrolyte therein and a run of said carrier element outwardly of said receptacle, a source of electric potential and connections between the same and said carrier element causing the portions of said element and said silver surfaces thereon in said dipping run to function as an anode in contact with said electrolyte, a second electrode immersed in said liquid electrolyte in said receptacle and connections between the same and said source of electric potential causing said second electrode to function as a cathode, whereby said silver surfaces on said carrier element may be electrolytically activated with said electro-negative element as yielded by said liquid electrolyte, and means for contacting the liquid to be sterilized with said activated silver surfaces on said formed bodies on said carrier element.

ALEXANDER GOETZ.